N. E. THRAPP, S. A. W. & F. M. HINDMAN.
ANIMAL-TRAP.
No. 175,203. Patented March 21, 1876.
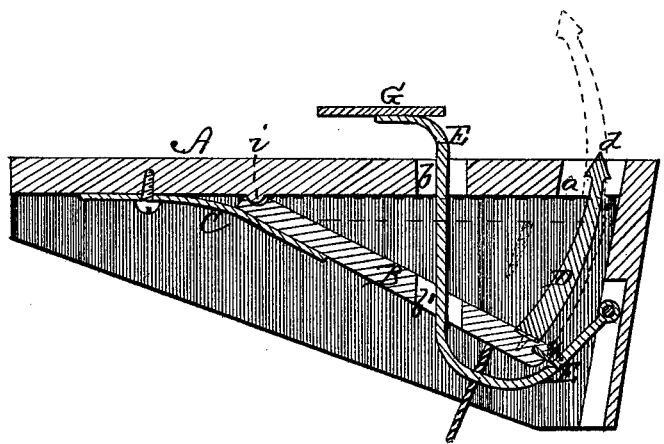
WITNESSES
Chas. M. Bart.
C. L. Evert.
INVENTOR
N. E. Thrapp, S. A. W. Hindman & F. M. Hindman
By Alexander Mason
Attorneys

UNITED STATES PATENT OFFICE.

NOAH E. THRAPP, SAMUEL A. W. HINDMAN, AND FRANKLIN M. HINDMAN, OF BEDFORD, ASSIGNORS OF ONE-FOURTH THEIR RIGHT TO JOSEPH R. STUNDLEY, OF PLATTEVILLE, IOWA.

IMPROVEMENT IN ANIMAL-TRAPS.

Specification forming part of Letters Patent No. 175,203, dated March 21, 1876; application filed August 26, 1875.

*To all whom it may concern:*

Be it known that we, NOAH E. THRAPP, SAMUEL A. W. HINDMAN, and FRANKLIN M. HINDMAN, of Bedford, in the county of Taylor, and in the State of Iowa, have invented certain new and useful Improvements in Animal-Traps; and do hereby declare that the following is a full, clear, and exact description thereof, reference being had to the accompanying drawings, and to the letters of reference marked thereon, making a part of this specification.

The nature of our invention consists in the construction and arrangement of an animal-trap, as will be hereinafter more fully set forth.

In order to enable others skilled in the art to which our invention appertains to make and use the same, we will now proceed to describe its construction and operation, referring to the annexed drawing, which represents a longitudinal vertical section of the trap.

A represents a box of any suitable dimensions, made substantially in the form shown, and inverted, the bottom of the box forming the top, and in the same are made two slots, $a$ and $b$. Within the box is a lever, B, connected to the under side of the top A by means of a spring, C, the tendency of which is to throw the lever against said top, the lever turning on a semicircular bead, $i$, as its fulcrum, near its inner end. From the outer or free end of the lever B projects a curved arm, D, formed with a sharp-pointed, spear-shaped head, $d$, said arm projecting through the slot $a$, as shown. Through the slot $b$ in the top A, and through the slot, $b'$, in lever B, is passed a trigger rod or bar, E, the lower end of which is curved, as shown, and hinged or pivoted to the inner side of the end of the box nearest to the free end of the lever B. On the upper end of the hinged trigger-bar E is a plate or platform, G. From the free end of the lever B projects a spur, $x$, which, when the lever is drawn down, catches in a notch in the trigger bar or rod E, and holds the plate G elevated a short distance above the box.

This trap is to be set in the mouth of the hole made by the animal in the ground, and as the animal attempts to enter or pass out it must step on the plate G, thereby releasing the lever B, which is thrown by the spring C forcibly upward, and thereby driving the spear-shaped head $d$ of the arm D into the body of the animal.

Having thus fully described our invention, what we claim as new, and desire to secure by Letters Patent, is—

The combination of the slotted box A, slotted lever B, with spur $x$, spring C, arm D, with spear-shaped head $d$, and notched trigger-rod E, hinged or pivoted at one end, passing through the lever and box, and provided with plate G, all as and for the purposes herein set forth.

In testimony that we claim the foregoing we have hereunto set my hand this 3d day of August, 1875.

NOAH E. THRAPP.
    S. A. W. HINDMAN.
    F. M. HINDMAN.

Witnesses:
 WM. E. CRUM,
 J. S. JACKSON.